United States Patent [19]
Yoder et al.

[11] Patent Number: 6,014,757
[45] Date of Patent: Jan. 11, 2000

[54] FAST DOMAIN SWITCH AND ERROR RECOVERY IN A SECURE CPU ARCHITECTURE

[75] Inventors: Ronald W. Yoder; Russell W. Guenthner; Wayne R. Buzby, all of Mesa, Ariz.

[73] Assignee: Bull HN Information Systems Inc., Billerica, Mass.

[21] Appl. No.: 08/994,476

[22] Filed: Dec. 19, 1997

[51] Int. Cl.[7] ................................................. G06F 11/00
[52] U.S. Cl. .............................................................. 714/15
[58] Field of Search .................................. 711/200, 211, 711/114; 714/6, 8, 16, 20, 38, 39, 31, 25, 42

[56] References Cited

U.S. PATENT DOCUMENTS

| | | | |
|---|---|---|---|
| 4,530,052 | 7/1985 | King et al. ................................ | 711/200 |
| 4,823,256 | 4/1989 | Bishop et al. ............................ | 364/200 |
| 4,914,576 | 4/1990 | Zelley et al. ............................. | 364/200 |
| 5,553,232 | 9/1996 | Wilhite et al. ............................ | 714/6 |
| 5,905,857 | 5/1999 | Buzby et al. .............................. | 714/38 |

*Primary Examiner*—Robert W. Beausoliel, Jr.
*Assistant Examiner*—Pierre E. Elisca
*Attorney, Agent, or Firm*—J. H. Phillips; J. S. Solakian

[57] ABSTRACT

In order to gather, store temporarily and efficiently deliver safestore information in a CPU having data manipulation circuitry including a register bank, first and second serially oriented safestore buffers are employed. At suitable times during the processing of information, a copy of the instantaneous contents of the register bank is transferred into the first safestore buffer. After a brief delay, a copy of the first safestore buffer is transferred into the second safestore buffer. If a call for a domain change (which might include a process change or a fault) is sensed, a safestore frame is sent to cache, and the first safestore buffer is loaded from he second safestore buffer rather than from the register bank. Later, during a climb operation, if a restart of the interrupted process is undertaken and the restoration of the register bank is directed to be taken from the first safestore buffer, this source, rather than the safestore frame stored in cache, is employed to obtain a corresponding increase in the rate of restart. In one embodiment, the transfer of information between the register bank and the safestore buffers is carried out on a bit-by-bit basis to achieve additional flexibility of operation and also to conserve integrated circuit space.

36 Claims, 5 Drawing Sheets

FIG. 5

FAST DOMAIN SWITCH AND ERROR RECOVERY IN A SECURE CPU ARCHITECTURE

FIELD OF THE INVENTION

This invention relates to computer central processors and, more particularly, to the repetitive temporary storage of central processing register contents and other information in a safestore frame in order to facilitate recovery from a fault or transfer to another domain.

BACKGROUND OF THE INVENTION

As personal computers and workstations become more and more powerful, makers of mainframe computers have undertaken to provide features which cannot readily be matched by these smaller machines in order to stay viable in the marketplace. One such feature may be broadly referred to as fault tolerance which means the ability to withstand and promptly recover from hardware faults without the loss of crucial information. The central processing units of mainframe computers typically have error detection circuitry, and sometimes error recovery circuitry, built in at numerous information transfer points in the logic to detect and characterize any fault which might occur.

The CPU(s) of a given mainframe computer comprises many registers logically interconnected to achieve the ability to execute the repertoire of instructions characteristic of the computer. In this environment, the achievement of genuinely fault tolerant operation, in which recovery from a detected fault can be instituted at a point in a program immediately preceding the faulting instruction/operation, requires that one or more recent copies of all the software visible register be maintained and constantly updated. This procedure is typically carried out by reiteratively sending copies of the registers (safestore information) to a special, dedicated memory or memory section. In some CPUs, the safestore information is sent via a result bus during periods when the result bus is not otherwise occupied in order to minimize the number of conductive leads required, an important consideration in the use of smaller and smaller and yet ever more complex integrated circuitry. Sometimes, two safestore memories are provided to receive and temporarily alternately store two recent, but one always more recent, copies of the software visible registers. When a fault occurs and analysis (performed, for example, by a service processor) determines that recovery is possible, the safestore information is used to reestablish the software visible registers in the CPU with the contents held recently before the fault occurred so that restart can be tried from the corresponding place in program execution.

A basic exposition of the storage and use of safestore frames is presented in U.S. Pat. No. 5,276,862, entitled SAFESTORE FRAME IMPLEMENTATION IN A CENTRAL PROCESSOR, by Lowell D. McCulley et al, assigned to the same assignee as the present invention and incorporated by reference herein.

Those skilled in the art are aware of certain drawbacks to the usual provision of safestore capability, which drawbacks directly adversely affect CPU performance. Thus, as higher levels of CPU performance are sought, the performance penalty resulting from the incorporation of safestore techniques to enhance fault tolerance must be more closely considered. The technique discussed above has several drawbacks that adversely affect CPU performance. First, even for the execution of simple instructions during which the safestore operation can be interleaved intermediate other processes which do not use the result bus so as to cause no extra cycle time, some of the registers to be safestored are typically half-word in length and cannot be stored packed into the dedicated memory. As a result, during both the storage process of the safestore information into the dedicated memory (especially, since this is an ongoing procedure) and the recovery of the safestore information (less important since necessary only on fault recovery or a process change), more clock cycles are required to perform each operation.

Additional drawbacks include: 1) The contents of the accumulator and supplementary accumulator registers in a coprocessor may transiently be different than the corresponding registers in the main execution unit, the latter being those conventionally sent to safestore. This requires that the latest copy of these (and perhaps other) registers must be loaded with the latest version as single word stores. 2) Performing the safestore function during the execution of some instructions inherently costs one or two extra cycles, thus making the duration of these instructions correspondingly longer. 3) When the cache is commanded to recover the contents of the safestore information into cache memory in anticipation of a fault recovery/climb, no other cache commands can be executed by the climb during this move time.

While these characteristics are not design errors, their performance penalty is an obstacle to attaining the desired CPU speed level necessary to maintain competitiveness in the market. To a significant extent, these characteristics and their corresponding limitations on performance have been addressed by the inventions described in U.S. Pat. No. 5,553,232, entitled AUTOMATED SAFESTORE STACK GENERATION AND RECOVERY IN A FAULT TOLERANT CENTRAL PROCESSOR, by John E. Wilhite et al and U.S. Pat. No. 5,557,737, also entitled AUTOMATED SAFESTORE STACK GENERATION AND RECOVERY IN A FAULT TOLERANT CENTRAL PROCESSOR, by John E. Wilhite et al, both assigned to the same assignee as the present invention and incorporated by reference herein.

However, in all the foregoing prior art systems, the safestore frame resides in a memory and more particularly either in a dedicated or partially dedicated memory or in a private or shared cache memory. Therefore, the speed of changing domains and recovering from errors which take advantage of the availability of a valid safestore frame is inherently limited because of the need to recover the safestore frame from a memory. The subject invention is directed to obviating this necessity under certain conditions and accordingly realizing a significant performance increase in a fault tolerant computer system.

OBJECTS OF THE INVENTION

It is therefore a broad object of this invention to provide, in a central processor, fault tolerant operation in which the storage and recovery of safestore information takes place, under certain conditions, without the need to access a valid copy of a safestore frame stored in a memory.

It is a more specific object of this invention to provide a fault tolerant central processing unit in which safestore operation is achieved by the implementation of a pair of serially disposed, logically interconnected safestore buffers such that safestore information, known to be valid, temporarily stored in the safestore buffers may be directly accessed during a climb procedure from a domain change or recoverable error.

SUMMARY OF THE INVENTION

Briefly, these and other objects of the invention are achieved, in a CPU having data manipulation circuitry including a plurality of registers comprising a register bank, by employing first and second serially oriented safestore buffers. At suitable times during the processing of information by the data manipulation circuitry, a copy of the instantaneous contents of the register bank is transferred into the first safestore buffer. After a brief delay, a copy of the instantaneous contents of the first safestore buffer is transferred into the second safestore buffer. If a call for a domain change is sensed or, under certain conditions, if a fault (itself a type of call for a domain change) in the CPU is sensed, the first safestore buffer is loaded from the second safestore buffer rather than from the register bank. Later, if a restart of the interrupted process is undertaken and the restoration of the register bank is directed to be taken from the first safestore buffer, this source, rather than the safestore frame stored in cache, is employed to obtain a corresponding increase in the rate of restart. If it is determined that the register bank information stored in the first safestore buffer is invalid or questionable, then restoration of the register bank may be taken from the safestore frame in memory. In a preferred embodiment, the register bank information is packed before it is sent to the first safestore buffer and unpacked when the register bank is restored from either the first safestore buffer or the safestore frame retrieved from cache. In an especially preferred embodiment for some computer systems, the transfer of information between the register bank and the first safestore buffer is carried out on a bit-by-bit basis to permit such transfer of the various registers independently at convenient and valid times and also to more efficiently use integrated circuit space.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
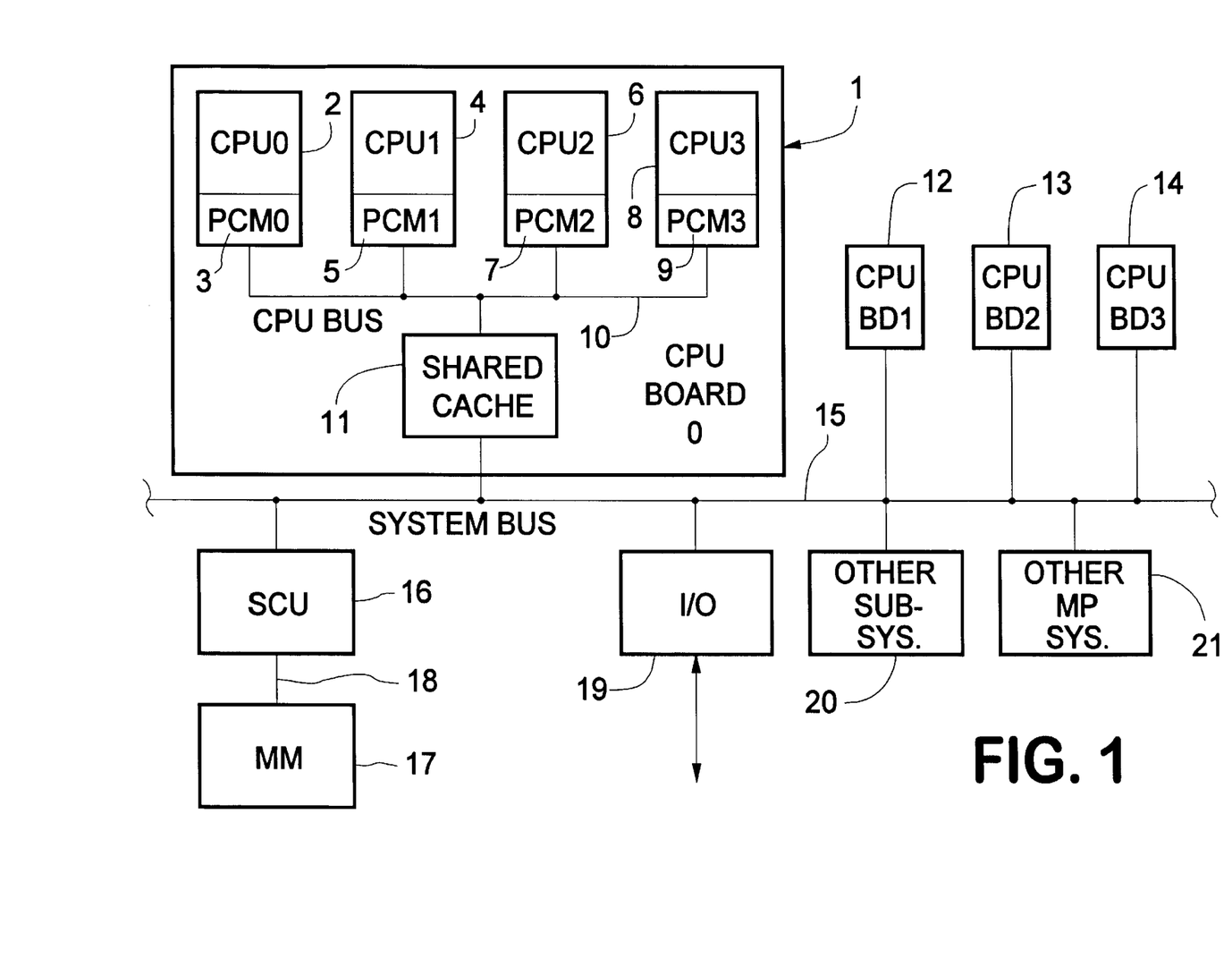
FIG. 1 is a high level block diagram of an multiprocessor computer system which is an exemplary environment for practicing the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4, 6, 8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 18 via a memory bus 17. In addition, one or more input/output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system, and other, complete, multiprocessor systems, represented by the block 21, may also communicate with the multiprocessor system depicted in FIG. 1 via the system bus 15. System control unit 16 also conventionally provides a multi-phase clock to all the system units.

Figure 2:
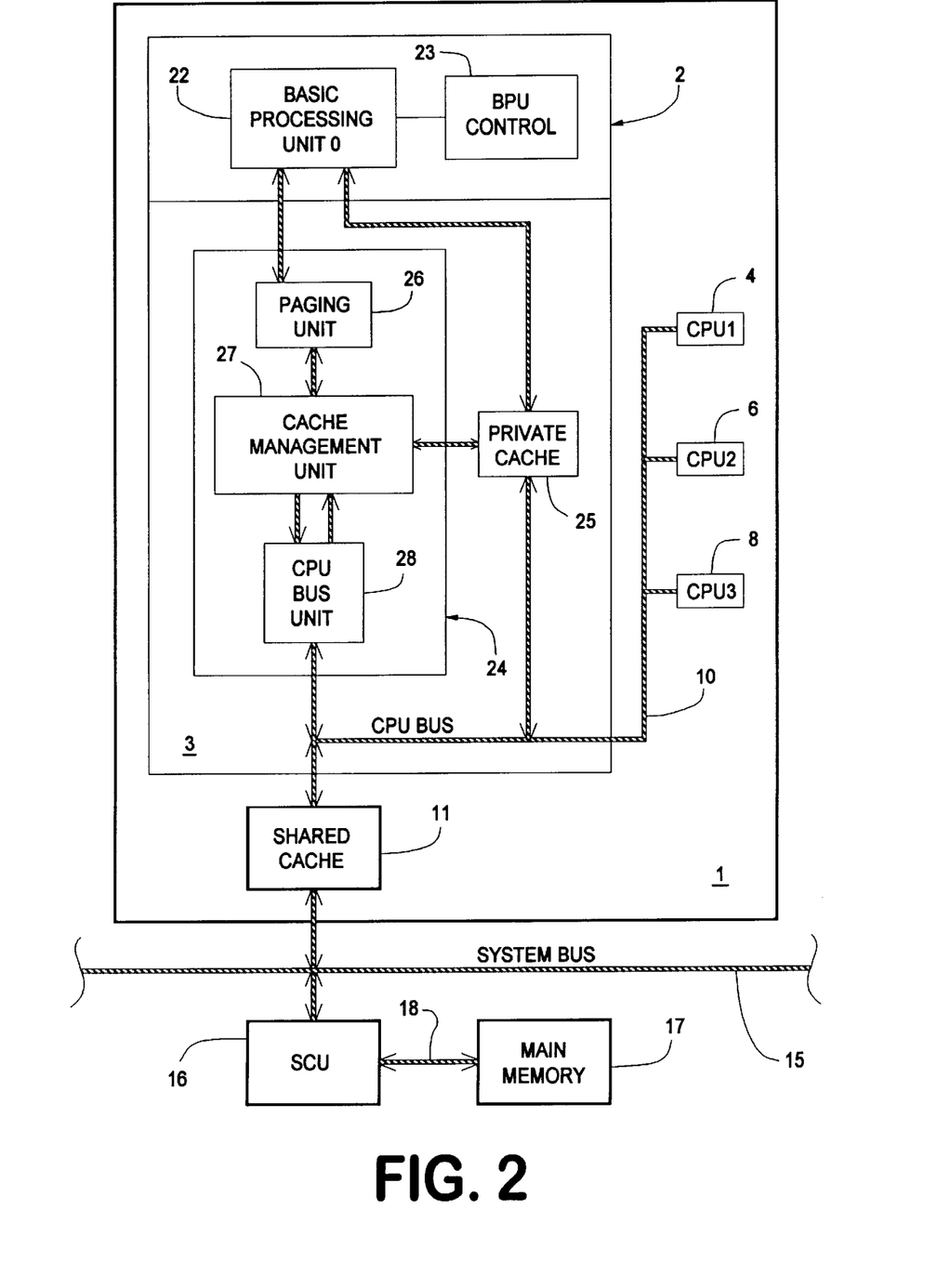
FIG. 2 is a slightly lower level block diagram showing additional details of an exemplary CPU board in the multiprocessor system of FIG. 1.

FIG. 2 is a slightly lower level block diagram of CPU "0" 2 of CPU board 1 (CPU Board "0") illustrating additional structure which is present in each CPU in the system. CPU "0" 2 includes a basic processing unit (BPU) 22 and BPU control and support circuitry 23 therefor.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to BPU "0" 22.

As previously described, shared cache 11 also interfaces with system bus 15 and, via system bus 15, with system control unit 16 and other systems/subsystems shown in FIG. 1. Main memory 17 may be accessed via the system control unit 16 and memory bus 18.

It will be seen that there axe numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17 via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Detailed structure and a comprehensive discussion of the operation of the exemplary private cache module 3 is included in copending U.S. patent application Ser. No. 0,3/796,309, entitled MULTIPROCESSOR COMPUTER SYSTEM INCORPORATING METHOD AND APPARATUS FOR DYNAMICALLY ASSIGNING OWNERSHIP OF CHANGEABLE DATA, by Elisabeth Vanhove et al, filed Feb. 7, 1997, and assigned to the common assignee herewith, incorporated by reference herein.

Figure 3:
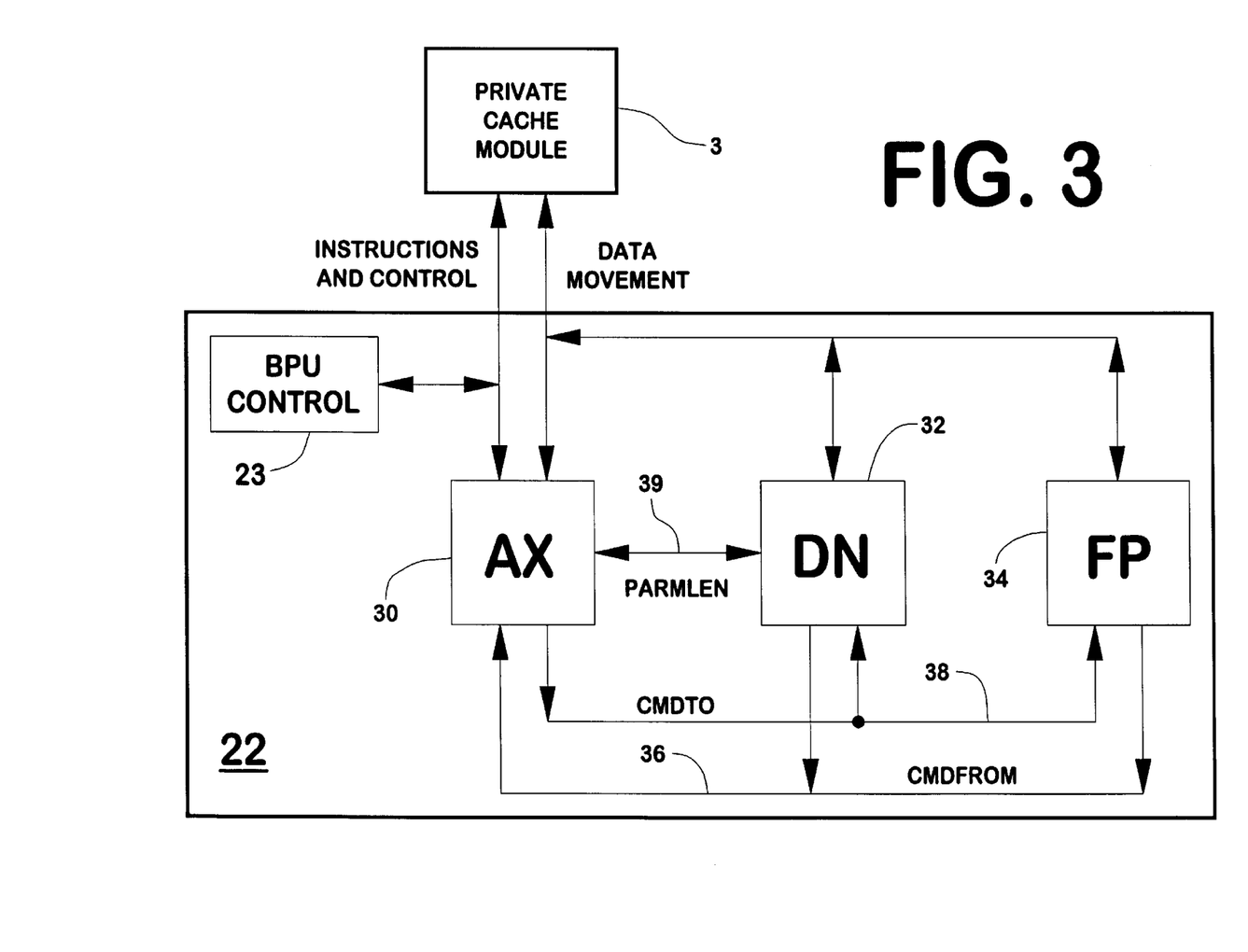
FIG. 3 is a block diagram showing additional details of a basic processing unit (BPU) included within each CPU on the CPU board shown in FIG. 2, each CPU including an address and execution (AX) unit, a decimal numeric (DN) unit, a floating point FP unit and BPU control logic.

FIG. 3 is a block diagram which shows additional details of an exemplary BPU 22 in the CPU 2. An address and execution (AX) unit 30 is a microprocessing engine which performs all address preparation and executes all instructions except decimal arithmetic, binary floating point and multiply/divide instructions. The main functions performed by the AX unit 30, in close alliance with the BPU control logic 23, include:

effective and virtual address formation;

memory access control;

security checks;

register change/use control;

execution of basic instructions, shift instructions, security instructions, character manipulation and miscellaneous instructions; and control and maintenance of a safestore frame used in conjunction with domain changes and error recovery.

Efficient scientific calculation capability is implemented in a floating point (FP) coprocessor unit 34. The FP unit 34 executes all binary floating point arithmetic. This unit, operating in concert with the AX unit 30, performs scalar or vector scientific processing.

The FP unit 34:

executes all binary and fixed and floating point multiply and divide operations;

computes 12 by 72-bit partial products in one machine cycle;

computes eight quotient bits per divide cycle;

performs modulo 15 residue integrity checks;

executes all floating point mantissa arithmetic;

executes all exponent operations in either binary or hexadecimal format;

preprocesses operands and post-processes results for multiply and divide instructions; and provides indicator and status control.

A decimal numeric (DN) coprocessor unit 32 performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX unit 30. The DN unit both receives operands from and sends results to the private cache 3. A CMDTO ("command to") bus 38 and a CMDFROM ("command from") bus 36 couple together the AX unit 30, the DN unit 32 and the FP unit 34 for certain interrelated operations. A PARMLEN bus 39 communicates parameter length information between the AX unit 30 and the DN unit 32 to specify the effective lengths and scales of operands and results.

Figure 4:
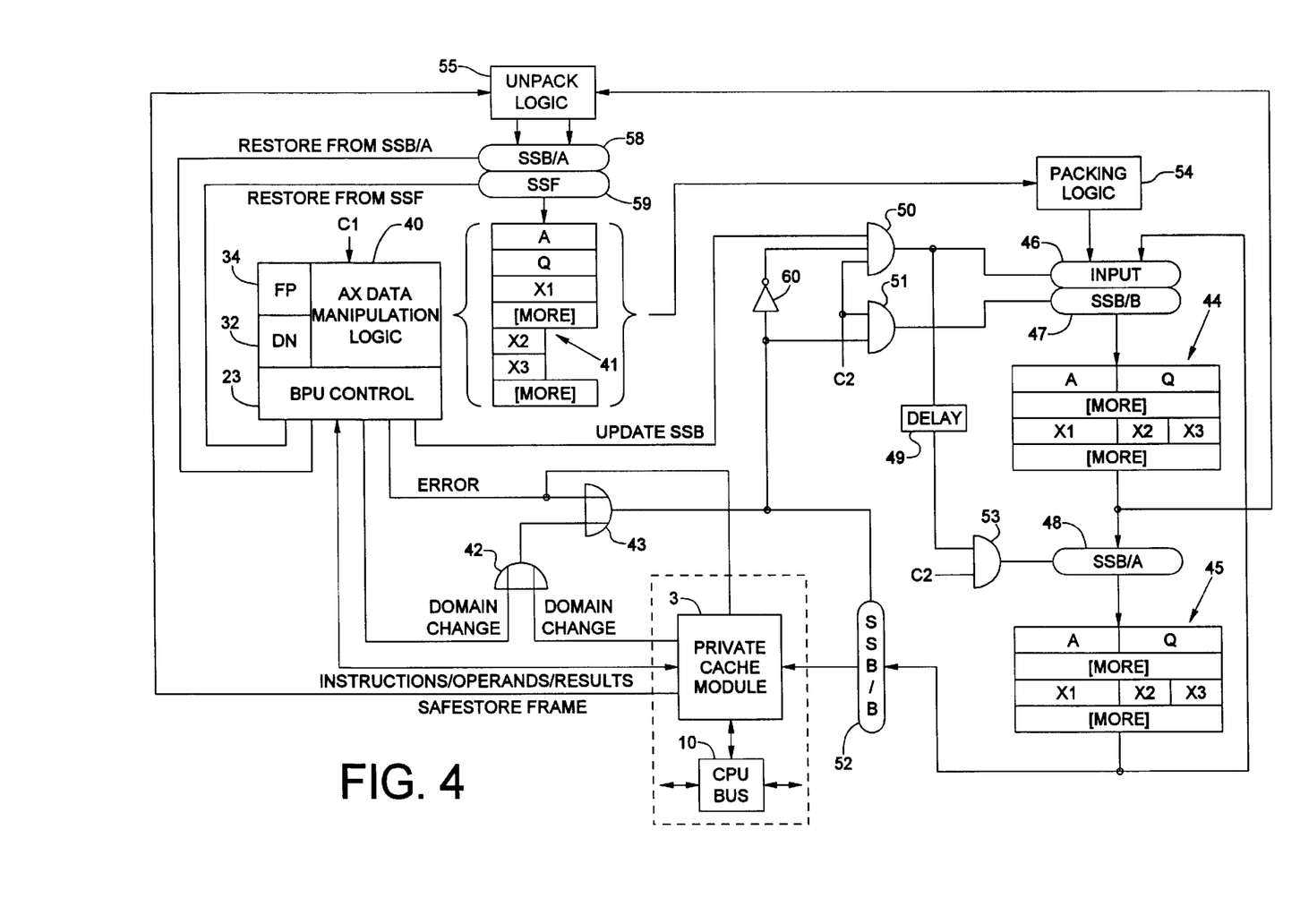
FIG. 4 is a modified block diagram of the BPU, particularly showing components of the AX unit effecting an exemplary embodiment of the present invention.

Attention is now directed to FIG. 4 which reveals the details of the present invention. AX data manipulation logic circuitry 40 includes numerous registers, represented by register block 41, which are logically interconnected to achieve the repertoire of possible data manipulation operations. Typically in the exemplary CPU, the final (and sometimes meaningful intermediate) results of a given operation are placed in an "A" (accumulator) register and a "Q" (supplementary accumulator) register and are periodically transmitted to the private cache module 23 (in the exemplary environment) as two 40-bit words (thirty-six data bits and four parity bits) as previously described. The register block 41 includes other registers, such as index registers of various lengths, represented by registers X1, X2 and X3, and additional registers represented by the "[more]" blocks.

In order to achieve both speed of operation and the ability to change domains and to recover from errors, a safestore frame of instantaneous register contents is periodically developed and methodically saved as is well known in the prior art. This task is performed more efficiently according to the present invention with the logic shown in FIG. 4. In the system family to which the present invention belongs, safestore frames are conventionally "packed" into double word segments because data manipulation results are sent to the private cache module via a double word bus (which, in a practical embodiment, may be the same bus on which computing results are sent) and also because some of the registers to be saved are half-word in length (e.g., X2 and X3) or some other length susceptible to packing. This process is carried out in the conventional packing logic block 54 which is conventional steering circuitry, a counterpart of which is described in somewhat more detail in U.S. Pat. No. 5,553,232 and 5,557,737, previously referenced.

The AX unit includes a series oriented safestore buffer pair disposed logically between the packing logic 54 and the output to the private cache module 3 where a reserve copy of the safestore information is stored for recovery from more extensive error conditions or extended domain changes. In the example, safestore buffer A 44 and safestore buffer B 45 are substantially identical, and both are configured to temporarily store a safestore frame in two-word wide packed form. The input control to safestore buffer A 44 is effected by multiplexers 46, 47 multiplexer 47 which respectively selectively admit the output of the packing logic 54 and the contents of safestore buffer B 45 into safestore buffer A 44. Similarly, the input control to safestore buffer B 45 is effected by a multiplexer 48 which selectively admits the contents of safestore buffer A 44 into safestore buffer B 45.

In the exemplary environment, a conventional dual phase clock is employed; i.e., alternating clock pulses C1 and C2 are used to synchronize various logic operations and data moves. Most of the logic operations carried out by the AX data manipulation logic 40 are established by C1 to the extent that the contents of the register bank 41, absent an error condition, may be deemed instantaneously valid before the succeeding C2 clock pulse is issued. Thus, C2 can be employed, with other information, to time the loading of the safestore buffers A 44 and B 45 and to transfer the contents of safestore buffer B 45 to the private cache module 3 as a safestore frame.

From time-to-time, for example, after a command has been fully executed or a significant intermediate result during the execution of a command has been reached, the contents of the registers in the stack 41 are stable and meaningful. At this time, the BPU control issues an update SSB signal which is applied as one input to an AND-gate 50 which drives the control input to multiplexer 46. A second input to AND-gate 50 is driven by the output from an inverter 60 which, unless OR-gate 43 is enabled as will be discussed in detail below, will enable the second input to AND-gate 50. As a result, when C2 fully enables the AND-gate 50, the multiplexer 46 transfers the packed register information from the packing logic 54 into the safestore buffer A 44.

A delay circuit 49, which may be a suitable monostable multivibrator, delay line or like functional device, delays the signal which actuates the input multiplexer 46 for a sufficient period (at least until after the current C2 ends), and the output from the delay circuit 49 is applied as one input to an AND-gate 53 which drives the control input to multiplexer 48 which has as an input array the current contents of safestore buffer A 44. The second input to AND-gate 53 is also C2 such that, on the C2 succeeding that which updated safestore buffer A 44, AND-gate 53 will be fully enabled, and the safestore buffer B 45 will be updated with the same packed register information.

Also from time-to-time, various events may call for a domain change; i.e., a change to institute another process which will be followed at some later (typically, very short) time by a return to continue the previous process. As represented by one of the inputs to OR-gate 42 in FIG. 4, a requirement for a domain change may originate from the AX unit as a result of conditions sensed in the AX data manipulation logic 40 or elsewhere, for example, in the FP unit 34 or in the DN unit 32, in die basic processing unit; A domain change requirement may also originate externally from the present CPU as represented by the second input (from the private cache module 3 which, as previously described, is in communication with the rest of the system) to the OR-gate 42.

The output of OR-gate 42 is applied as one input to another OR-gate 43 such that, if either domain change signal is present, the OR-gate 43 is also enabled, and its output is applied as a first input to AND-gate 51, the output of which is applied to the control input of multiplexer 47 and also to the input of inverter 60. Therefore, on the next C2 clock pulse, AND-gate 51, rather than AND-gate 50, will be enabled, and the multiplexer 47 will transfer the contents of safestore buffer B 45 into the safestore buffer A 44.

In addition, a domain change signal from the output of OR-gate 43 also drives the control input to multiplexer 52 which has as an input array the current contents of safestore buffer B 45. Thus, upon the event of a domain change, the contents of safestore buffer B 45 are copied as a safestore frame into the private cache module 3.

As long as the domain change signal is present, the contents of the safestore buffer A 44 will remain a valid, packed copy of the contents of the register bank 41 from the interrupted domain, and even after the domain change signal ends, the contents of the safestore buffer A 44 will remain the same and valid unless and until BPU control 23 issues an update SSB signal. This latter condition can take place if the interrupting domain is a sufficiently extended process that the safestore buffer should now methodically save the contents of the register bank 41 as the interrupting domain process proceeds. However, if the interrupting domain is very brief such that the update SSB signal is not issued before the BPU control 23 issues either a restore from SSB/A signal or a restore from SSF signal (as conditions may require), then the interrupted process can resume by restoring the register bank, unpacked by unpack logic block 55, such that the interrupted process can pick up immediately at the point of interruption. Thus, if the interrupting process was completed in a short time, it will be understood that the register bank 41 can be restored very quickly from the safestore buffer A 44 by the issuance of the restore from SSB/A signal and the interrupted process restarted correspondingly efficiently.

It is also possible for a process to be interrupted by an error occurring somewhere in the basic processing unit which causes the BPU control 23 to issue an error signal. (For a discussion of various error conditions which would cause the issuance of an error signal in a similar basic processing unit, reference may be taken to U.S. Pat. No. 5,263,034 entitled ERROR DETECTION IN THE BASIC PROCESSING UNIT OF A VLSI CENTRAL PROCESSOR, by Russell W. Guenthner et al, filed Oct. 9, 1990, and assigned to the common assignee herewith, incorporated by reference herein.)

An error signal will enable OR-gate 43 which, as previously described, disables AND-gate 50 and enables AND-gate 51 such that, on the next C2, safestore buffer A 44 is loaded from safestore buffer B 45 rather than from packing logic 54. This is a particular advantage because the immediately previous contents of safestore buffer A 44 may have been corrupted; i.e., may have been loaded with questionable register contents on the previous loading cycle. However, the contents of safestore buffer B 45 are still valid and, once the safestore buffer A 44 has been reloaded from the safestore buffer B 45, its contents, too, are valid.

An error may range from a mere transient artifact, perhaps detected by parity circuitry internal to the basic processing unit to a significant problem which requires analysis by an external device such as a service processor. Thus, the error signal may be sent to another system component, via the private cache module 3, for analysis and a determination as to whether a restart should be tried or the restart attempt decision may be made locally. In the latter case, if the decision is to try a restart, the restore from SSB/A signal may be issued to load the register bank 41 with contents known to be valid such that the restart can be undertaken with little loss in time if the error was indeed an anomaly. On the other hand, if the error was referred to an external analysis device which determines that a restart can be attempted, the analysis device may direct either that the register contents present in safestore buffer A 44 are valid and that the restore from SSB/A signal can be issued to load the register bank 41 from the safestore buffer A via the unpack logic 55 or that the register contents present in safestore buffer A 44 are invalid or questionable and that the restore from SSF signal can be issued to load the register bank 41, via the unpack logic 55, from the safestore frame stored in the private cache module 3. Further, if the error is determined by the external analysis device to require shutdown of the relevant basic processing unit, the safestore frame is available in the private cache module 3 for access, via the CPU bus 10, by another CPU in order that such other CPU can resume performing the interrupted process at the last valid point before the error signal was issued.

Those skilled in the art will recognize that the described response to a detected error/fault from which recovery is undertaken is merely another variety of domain change.

Figure 5:
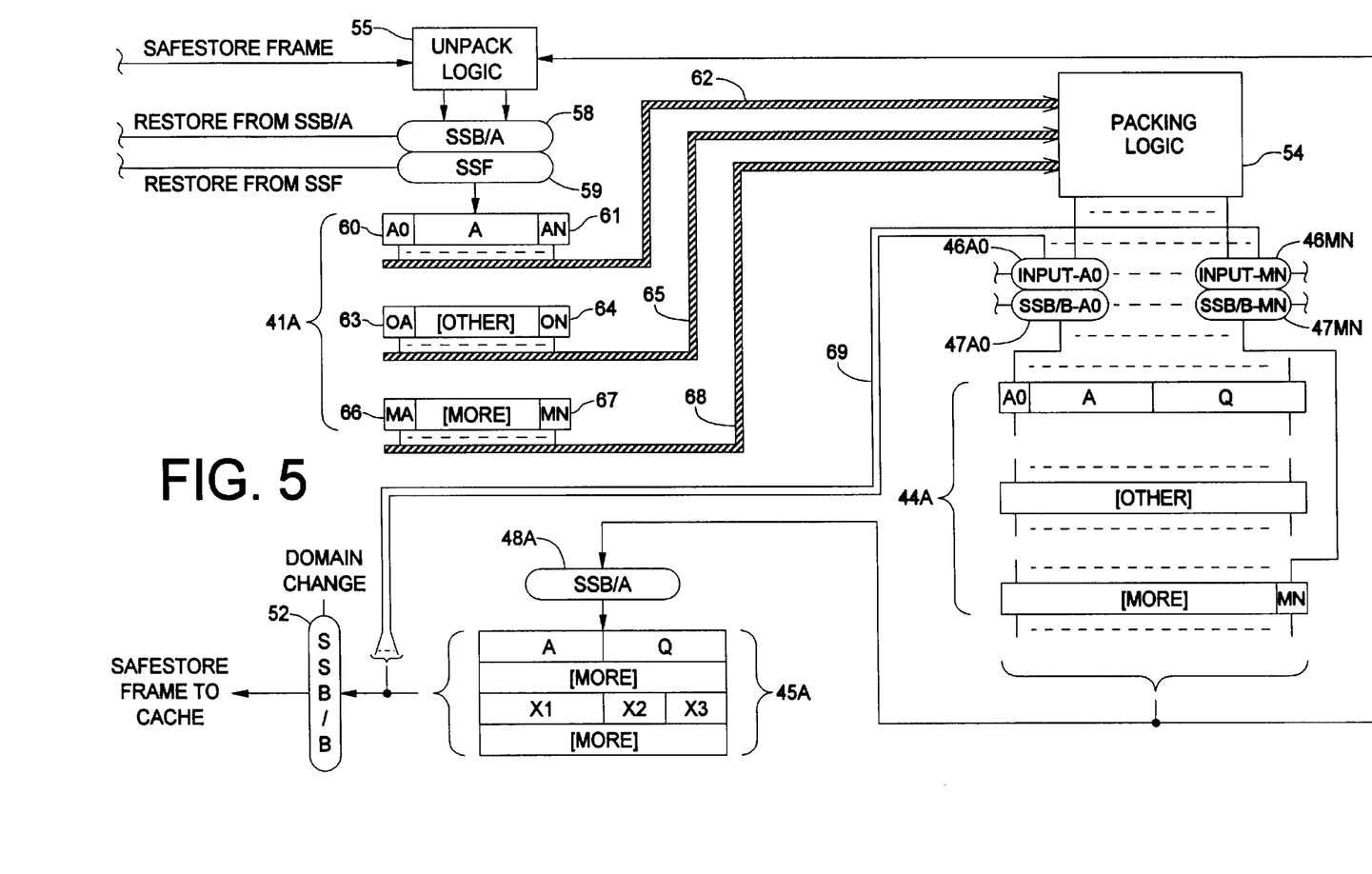
FIG. 5 is a block diagram of the principal components of a presently preferred embodiment of the invention.

FIG. 5 shows a presently preferred embodiment of the invention which is particularly characterized by the use of bit-by-bit from the register bank 41A to the packing logic 54 and thence into the first safestore buffer 44A and subsequently into the second safestore buffer 45A. For clarity in FIG. 5, the bit-by-bit details of only the first safestore buffer 44A are shown while the second safestore buffer 45A is shown at a higher level.

The advantage, in many computer systems (particularly mainframes), that the embodiment of FIG. 5 enjoys over that shown in FIG. 4 is that, as a practical matter, the various registers in the register bank 41A are ready to be transferred to the first safestore buffer 44A at different times because both C1 and C2 are routinely used in the AX data manipulation logic 40 (FIG. 4) and also because of other delays (for example, those related to pipelining) employed in this logic structure. Accordingly, it is advantageous to have the ability to make selective transfers of individual registers, and even individual bits, and the embodiment of the invention shown in FIG. 5 achieves this capability.

For convenience in explaining the configuration of FIG. 5, the register bank 41A and the first safestore buffer 44A are shown as including the A register, [OTHER] registers and [MORE] registers, it being understood that the same registers are included as Chose in register bank 41 (FIG. 4). Thus, on a bit-by-bit basis, the A register contents, from bit 0 60 to bit N 61, are periodically (as may be appropriate) transferred to the packing logic 54 on a suitably wide bus 62. Similarly, on a bit-by-bit basis, the contents of the [OTHER] (from bit 0 63 to bit N 64) and [MORE] (from bit 0 66 to bit N 67) registers are periodically (as may be individually appropriate) transferred to the packing logic 54 on suitably wide busses, 65, 68. (As a practical matter, the busses 62, 65, 68 are an accumulation of integrated circuit traces between the register bank 41A and the packing logic 54.)

Disposed between the packing logic 54 and the first safestore buffer 44A is an array of multiplexers 46A0 and 47A0 through 46MN and 47MN. Thus, in the example, each valid bit received from the packing logic 54 may be individually copied into the appropriate cell of the first safestore buffer 44A. For example, when a valid bit C0 of the A register is ready to be copied to the first safestore buffer 44A, a control signal from BPU control 23 (FIG. 24) enables the multiplexer 46A0 to effect the transfer and update this bit in the first safestore frame. As another example, when a valid bit MN (i.e., the last bit in the register bank 41A) is ready to be copied to the first safestore buffer 44A, a control signal from BPU control 23 (FIG. 24) enables the multiplexer 46MN to effect the transfer and update this bit in the first safestore frame. It will therefore be understood that the number of multiplexers 46A0–46MN corresponds to the number of bits in the first safestore frame 44.

Although not shown in detail, the structure of the second safestore buffer 45A corresponds to that of the first safestore buffer 44A, and the multiplexer 48A is a bit-by-bit array corresponding to the multiplexers 46A0–46MN; i.e., the multiplexer array 48A actually includes multiplexers SSB/A-A0 to SSB/A-MN. Accordingly, each control input to each of multiplexers SSB/A-A0–SSB/A-MN is delayed in a manner corresponding to the function of delay block 49 (FIG. 4) in order that the copy process, on a bit-by-bit basis, for the first safestore buffer 44A to the second safestore buffer 45A takes place on a succeeding C2 (or other suitable) clock pulse so that, as previously described, the contents of the second safestore buffer may be used, if appropriate, to effect a climb after a domain change or during a recover from an error.

As previously described, but on a bit-by-bit basis, in the event of a domain change (including error recovery) and, if appropriate, use of the safestore buffer structure (rather than the safestore frame sent to cache) is indicated, the contents of the second safestore buffer 45A are copied back to the first safestore buffer A on a bus 69 (integrated circuit traces) by enabling the control inputs to the multiplexer array SSB/B-A0–SSB/B-MN. While there may be practical circuit reasons (for example, efficient use of integrated circuit space) to effect this transfer on a bit-by-bit basis, this particular entire transfer process can be effected in parallel and simultaneously; i.e., a single enable signal is applied to all the multiplexers SSB/B-A0–SSB/B-MN.

By the use of the dual series oriented safestore buffers as described, a climb operation following a domain change can often be carried out without the need to access the safestore frame stored in a memory with a corresponding substantive increase in overall performance. Further, similar advantage is obtained during the recovery from a BPU error which is found to be a transient artifact. Particular advantage is obtained by performing certain of the copying and transfer tasks on a bit-by-bit basis as discussed above in conjunction with FIG. 5.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A central processing unit comprising:
    A) data manipulation circuitry including a plurality of registers comprising a register bank;
    B) a first safestore buffer;
    C) first transfer control means for transferring a copy of the instantaneous contents of said register bank into said first safestore buffer;
    D) a second safestore buffer;
    E) second transfer control means for transferring a copy of the instantaneous contents of said first safestore buffer into said second safestore buffer;
    F) third transfer control means, responsive to sensing a domain change, for transferring a copy of the instantaneous contents of said second safestore buffer into said first safestore buffer; and
    G) fourth transfer control means, responsive to a directed recovery from said first safestore buffer, for transferring a copy of the instantaneous contents of said first safestore buffer to said register bank.

2. The central processing unit of claim 1 in which said third transfer control means is also responsive to a sensed fault in the central processing unit for transferring a copy of the instantaneous contents of said second safestore buffer into said first safestore buffer.

3. The central processing unit of claim 2 which further includes a memory and fifth transfer control means for transferring a copy of the instantaneous contents of said second safestore buffer into a safestore frame in said memory.

4. The central processing unit of claim 3 which further includes sixth transfer control means, responsive to a directed recovery from the safestore frame resident in said memory, for transferring a copy of the instantaneous contents of said safestore frame resident in said memory to said register bank.

5. The central processing unit of claim 4 in which said first and second safestore buffers each comprise a plurality of double word length temporary storage elements and which further includes packing logic for packing the contents of said register bank into double word length segments before transfer of the copy thereof to said first safestore buffer.

6. The central processing unit of claim 5 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

7. The central processing unit of claim 2 in which said first and second safestore buffers each comprise a plurality of double word length temporary storage elements and which further includes packing logic for packing the contents of said register bank into double word length segments before transfer of the copy thereof to said first safestore buffer.

8. The central processing unit of claim 7 in which said fourth transfer means includes unpacking logic for unpacking the safestore information before transfer thereof to said register bank.

9. The central processing unit of claim 8 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

10. The central processing unit of claim 7 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

11. The central processing unit of claim 2 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

12. The central processing unit of claim 3 in which said first and second safestore buffers each comprise a plurality of double word length temporary storage elements and which further includes packing logic for packing the contents of said register bank into double word length segments before transfer of the copy thereof to said first safestore buffer.

13. The central processing unit of claim 12 in which said fourth transfer means includes unpacking logic for unpacking the safestore information before transfer thereof to said register bank.

14. The central processing unit of claim 13 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

15. The central processing unit of claim 3 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

16. The central processing unit of claim 12 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

17. The central processing unit of claim 4 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

18. The central processing unit of claim 1 which further includes a memory and fifth transfer control means for transferring a copy of the instantaneous contents of said second safestore buffer into a safestore frame in said memory.

19. The central processing unit of claim 18 which further includes sixth transfer control means, responsive to a directed recovery from the safestore frame resident in said memory, for transferring a copy of the instantaneous contents of said safestore frame resident in said memory to said register bank.

20. The central processing unit of claim 19 in which said first and second safestore buffers each comprise a plurality of double word length temporary storage elements and which further includes packing logic for packing the contents of said register bank into double word length segments before transfer of the copy thereof to said first safestore buffer.

21. The central processing unit of claim 20 in which said fourth transfer means includes unpacking logic for unpacking the safestore information before transfer thereof to said register bank.

22. The central processing unit of claim 21 in which:
A) said first transfer control means effects transfer of the copy of the instantaneous contents off said register bank into said first safestore buffer on a bit-by-bit basis; and
B) said second transfer control means effects transfer of the copy of the instantaneous contents of said first safestore buffer into said second safestore buffer on a bit-by-bit basis.

23. The central processing unit of claim 18 in which said first and second safestore buffers each comprise a plurality of double word length temporary storage elements and which further includes packing logic for packing the contents of said register bank into double word length segments before transfer of the copy thereof to said first safestore buffer.

24. The central processing unit of claim 23 in which said fourth transfer means includes unpacking logic for unpacking the safestore information before transfer thereof to said register bank.

25. The central processing unit of claim 24 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

26. The central processing unit of claim 23 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

27. The central processing unit of claim 18 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

28. The central processing unit of claim 19 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

29. The central processing unit of claim 5 in which said fourth transfer means includes unpacking logic for unpacking the safestore information before transfer thereof to said register bank.

30. The central processing unit of claim 29 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

31. The central processing unit of claim 20 in which:
A) said first transfer control means effects transfer of the copy of the instantaneous contents of said register bank into said first safestore buffer on a bit-by-bit basic; and
B) said second transfer control means effects transfer of the copy of the instantaneous contents of said first safestore buffer into said second safestore buffer on a bit-by-bit basis.

32. The central processing unit of claim 1 in which said first and second safestore buffers each comprise a plurality of double word length temporary storage elements and which further includes packing logic for packing the contents of said register bank into double word length segments before transfer of the copy thereof to said first safestore buffer.

33. The central processing unit of claim 32 in which said fourth transfer means includes unpacking logic for unpacking the safestore information before transfer thereof to said register bank.

34. The central processing unit of claim 33 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

35. The central processing unit of claim 32 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

36. The central processing unit of claim 1 in which:
A) said first transfer control means effects transfer of the copy of the instantaneous contents of said register bank into said first safestore buffer on a bit-by-bit basis; and
B) said second transfer control means effects transfer of the copy of the instantaneous contents of said first safestore buffer into said second safestore buffer on a bit-by-bit basis.

* * * * *